No. 774,943. PATENTED NOV. 15, 1904.
R. P. JACKSON.
CONTROLLER.
APPLICATION FILED JAN. 20, 1904.
NO MODEL.
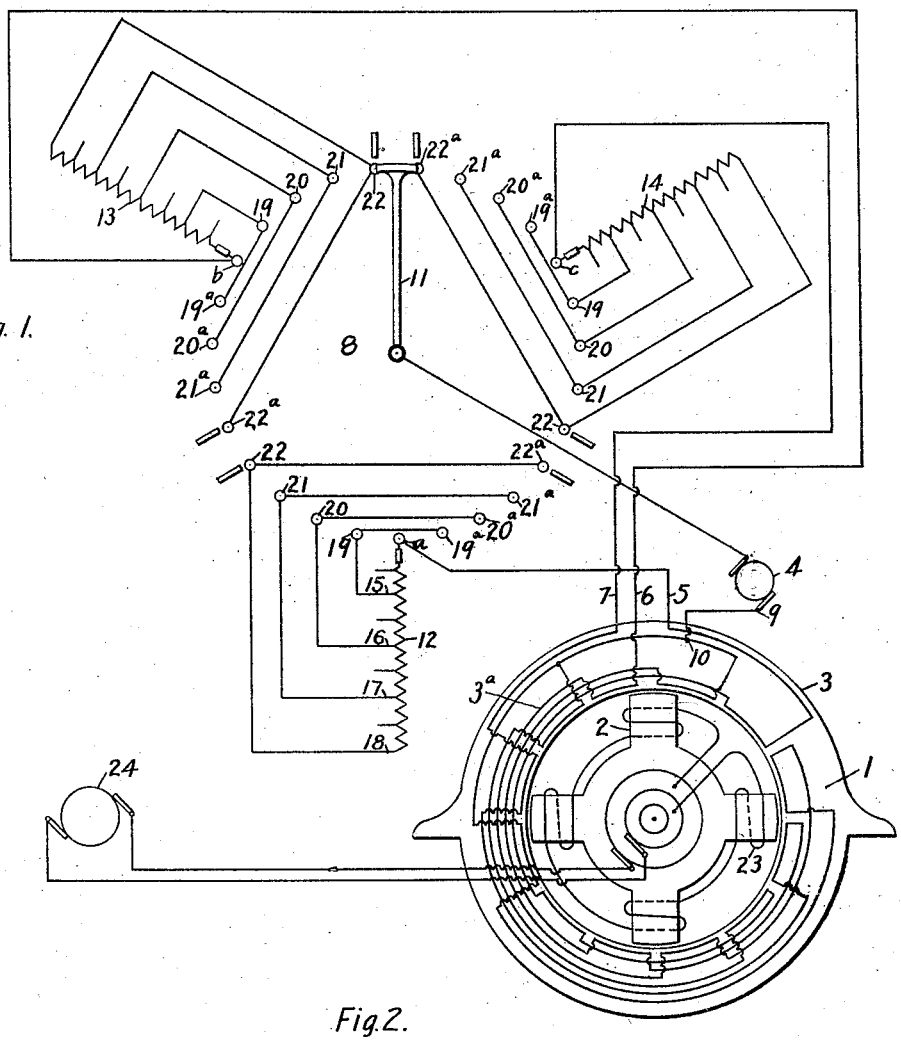
Fig. 1.
Fig. 2.
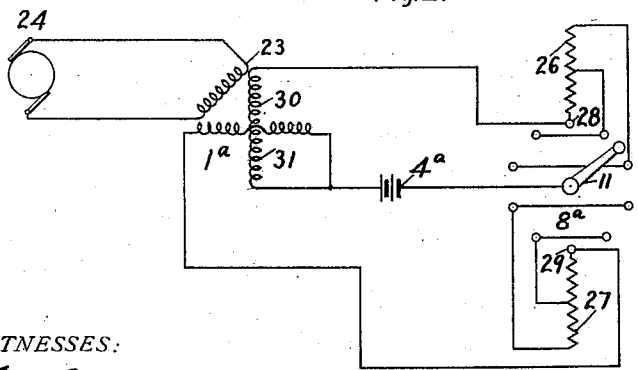
WITNESSES:
C. L. Belcher
Fred. H. Miller.
INVENTOR.
Ray P. Jackson
BY Wesley S. Carr
ATTORNEY.

No. 774,943.
Patented November 15, 1904.

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER.

SPECIFICATION forming part of Letters Patent No. 774,943, dated November 15, 1904.

Application filed January 20, 1904. Serial No. 189,907. (No model.)

*To all whom it may concern:*

Be it known that I, RAY P. JACKSON, a citizen of the United States, and a resident of Wilkinsburg, in the county of Allegheny and State of Pennsylvania, have invented a new and useful Improvement in Controllers, of which the following is a specification.

My invention relates to controllers for electrical circuits; and it has for its object to provide means for alternately increasing and decreasing the amount of current which is supplied successively to a plurality of circuits.

In the accompanying drawings, Figure 1 is a diagrammatic view of a controller for three-phase circuits, and Fig. 2 is a diagrammatic view of a controller applied to two-phase circuits, both constructed in accordance with my invention.

As here illustrated, my invention is utilized for slowly rotating the field-magnets of large alternating-current generators; and it consists of a simple and efficient means for supplying direct-current energy, which may be derived from any suitable source, such as a storage battery or a direct-current generator, in succession to the several sections of stationary polyphase armature-windings of such generators.

As illustrated in Fig. 1, the large generator 1 has a rotary field-magnet 2 and a stationary armature 3, provided with a polyphase winding $3^a$, to the several sections of which direct current is successively supplied from any suitable generator 4, which may be either a dynamo or a battery.

The three sections of the armature-winding are joined together in what is known as "star" connection, and the outer terminals 5, 6, and 7 thereof are respectively connected to the contact-terminals $a$, $b$, and $c$ of a controller 8 constructed in accordance with my invention. One terminal, 9, of the generator 1 is connected to the neutral point 10 of the armature-winding 2, and its other terminal is connected to the movable arm 11 of the controller 8.

The inner end of the subdivided resistance elements 12, 13, and 14 are respectively connected to the contact-terminals $a$, $b$, and $c$, and leads 15, 16, 17, and 18 from the various subdivisions of each of the resistance elements are connected to other contact-terminals 19, 20, 21, and 22, there being three sets of these contact-terminals. Three sets of contact-terminals $19^a$, $20^a$, $21^a$, and $22^a$ are also provided, which alternate in position with the sets 19, 20, 21, and 22, and the corresponding terminals on opposite sides of each resistance element are electrically connected together on the controller, as indicated. Connections may be made, however, directly between the corresponding or other points of the various resistance elements, if desired, the arrangement shown being adopted in order to reduce the number and complication of the leads. The field-magnet winding 23 of the machine 1 may be energized by current from an exciter 24 or from any other suitable source.

Assuming that the outer end of the movable arm 11 engages with the contact-terminal $22^a$ pertaining to resistance element 12, the circuit is from the generator 1 to the neutral point 10 of the armature-winding, through one section thereof to the terminal 5, thence to the controller contact-terminal $a$, and thence through the whole of the resistance 12 and the arm 11 back to the generator 1. If the arm 11 is moved in a clockwise direction, the amount of resistance 12 in the circuit is gradually reduced until the contact-terminal $a$ is reached. Further rotation of the arm in the same direction will progressively reintroduce the resistance 12, and thus cut down the current so that injurious arcing in passing from terminal 22 to terminal $22^a$ of resistance 13 is avoided. The circuit connections and changes which are effected by moving the contact-arm 11 over the contact-terminals pertaining to resistance 13 serve to vary the current in the second section of the armature-winding having the outer terminal 6 in the same manner as that already described with reference to the first section of the armature-winding having the outer terminal 5. The final third of the complete rotative movement of the arm 11 serves in the same manner to vary the current in the third section of the armature-winding having the outer terminal 7. It thus appears that the rotative action exerted upon the field-magnet 2 of the generator 1 is gradually applied and that the field-magnet may be thus moved at any desired rate of speed and may be easily started and stopped at the will of the attendant.

In Fig. 2 I have shown a modification for use in rotating the field-magnet of a two-phase machine 1ª, the essential difference between this modification and the arrangement shown in Fig. 1 being that here the controller 8ª has only two resistance elements 26 and 27, the inner terminals of which are respectively connected to contact-terminals 28 and 29 of the controller and one terminal of each phase of the armature-windings 30 and 31 is connected to one terminal of the generator 4ª. The controller here shown operates in all essential respects like that shown in Fig. 1 and already described and effects substantially the same result.

I claim as my invention—

1. A controller for a plurality of electrical circuits comprising subdivided resistance elements for the respective circuits, sets of contact-terminals connected to said resistance elements, and a movable contact member adapted to make engagement with all of said contact-terminals successively, the connections between each of the resistance elements and the corresponding contact-terminals being such that the resistance of each circuit is varied from a maximum to a minimum and vice versa, alternately, by a one-way movement of said member.

2. A controller for electrical circuits comprising a plurality of contact-terminals arranged in groups, subdivided resistance elements severally connected to said groups in such manner that the resistance included between the middle contact-terminal of each group and the contact-terminals on each side thereof in the same group will increase in successive gradations, and a movable contact member adapted to engage said contact-terminals.

3. A controller for electric circuits comprising a plurality of contact-terminals arranged in groups, a subdivided resistance element for each group having one end connected to the middle terminal of the groups and having the succeeding points of subdivision connected to corresponding contact-terminals on both sides of the middle terminal and a movable contact member adapted to engage said contact-terminals.

4. A controller for electrical circuits comprising a plurality of annularly-disposed contact-terminals arranged in groups, a subdivided resistance element for each group having one end connected to the middle terminal of the group and having the succeeding points of subdivision connected to corresponding contact-terminals on both sides of said middle terminal, and a movable arm adapted to engage said contact-terminals.

5. In apparatus for slowly rotating the field-magnet of an alternating-current machine, means for successively supplying direct-current energy to the several portions of the polyphase armature-winding and for alternately decreasing and increasing, in gradations, the amount of current supplied to each of said portions.

In testimony whereof I have hereunto subscribed my name this 11th day of January, 1904.

RAY P. JACKSON.

Witnesses:
M. L. RUNNER,
BIRNEY HINES.